United States Patent [19]

Itoh

[11] Patent Number: 4,544,339
[45] Date of Patent: Oct. 1, 1985

[54] APPARATUS FOR VULCANIZATION OF RUBBER BY DIELECTRIC HEATING

[75] Inventor: Masaru Itoh, Komaki, Japan

[73] Assignee: Toyoda Gosei Co., Ltd., Nishikasugai, Japan

[21] Appl. No.: 646,164

[22] Filed: Aug. 31, 1984

Related U.S. Application Data

[62] Division of Ser. No. 456,430, Jan. 7, 1983, Pat. No. 4,481,159.

[30] Foreign Application Priority Data

Jan. 30, 1982 [JP] Japan .................................. 57-7355

[51] Int. Cl.$^4$ .............................................. B29H 5/26
[52] U.S. Cl. ................................ 425/174.8 R; 425/41; 425/DIG. 13
[58] Field of Search .............. 425/40, 41, 42, 174.8 R, 425/DIG. 13

[56] References Cited

U.S. PATENT DOCUMENTS

| | | | |
|---|---|---|---|
| 2,438,952 | 4/1948 | Grotenhuis | 264/26 |
| 2,451,992 | 10/1948 | Grotenkins | 425/41 |
| 2,581,939 | 1/1952 | Deist et al. | 425/41 X |
| 2,738,406 | 3/1956 | Zaleski | 425/41 X |
| 2,739,351 | 3/1956 | Henning | 264/DIG. 46 |
| 2,754,546 | 7/1956 | Mason et al. | 475/174.8 R |
| 2,782,460 | 2/1957 | Krug et al. | 425/41 |
| 2,797,440 | 7/1957 | Bauermeister et al. | 425/41 |
| 2,797,441 | 7/1957 | Bauermeister et al. | 425/41 |
| 3,010,157 | 11/1961 | Cizek | 264/DIG. 46 |
| 3,770,931 | 11/1973 | Gilliatt | 425/41 X |
| 3,823,293 | 7/1974 | Gilliatt | 425/41 X |

Primary Examiner—J. Howard Flint, Jr.
Attorney, Agent, or Firm—Cushman, Darby & Cushman

[57] ABSTRACT

A method for vulcanizing rubber within a mold by dielectric heating. The mold is made of dielectric materials such as ceramics or plastics, and the rubber material is vulcanized within the mold in a dielectric heating furnace. The surface portions of the mold in contact with the rubber material are preferably made of a material having a high dielectric loss factor in order to heat the rubber material or to prevent cooling of the dielectrically heated rubber material by conduction of the heat toward the mold. The other portions of the mold are made of another material having a low dielectric loss factor. The mold is a separate mold. The separate mold is fixed in a frame made of a dielectric material having a low dielectric loss factor.

1 Claim, 5 Drawing Figures

APPARATUS FOR VULCANIZATION OF RUBBER BY DIELECTRIC HEATING

This is a division of my copending application Ser. No. 456,430, filed Jan. 7, 1983, now U.S. Pat. No. 4,481,159.

BACKGROUND OF THE INVENTION

1. Field of the Invention

The present invention relates to in-mold vulcanization of rubber by dielectric heating.

2. Description of the Prior Art

Rubber is conventionally vulcanized in an externally heated die. The rubber is vulcanization molded by the heat transferred from the heated mold. However, this method has such disadvantages as low thermal efficiency due to the necessity to heat the whole furnace, increased burring on the molding, prolonged time for preheating.

SUMMARY OF THE INVENTION

To solve above described problems, the inventor employs the high-frequency dielectric heating vulcanization which is conventionally used for continuous vulcanization to make rubber sponge and the like, and applies the method to rubber valcanization within a mold.

Accordingly, it is one object of the present invention to provide a heating method with a high thermal efficiency.

It is further object of the present invention to provide a heating method with a short time for preheating and vulcanization heating.

It is another object of the present invention to provide a heating method to obtain burr-free rubber moldings.

DETAILED DESCRIPTION OF THE PREFERRED EMBODIMENTS

The present invention employs a mold made of a dielectric material to eliminate the reflection of electric waves on the surface of the mold, for the conventional metal die reflects electric waves of dielectric heating on the die surfaces and therefore the rubber within the mold can not be heated.

At least either of the inner surface of the mold or the rubber material should be made of a dielectric material having a large dielectric loss factor, and at least either of them is heated by high-frequency dielectric heating, so that the rubber is vulcanized by the heating. The said dielectric materials may be non-metallic materials such as ceramics and plastics materials. The mold according to the present invention is formed of such material as ceramics or plastics.

In consideration of the characteristics required for the mold materials, such as the strength and the thermal stability in vulcanization, such plastic materials are preferable as highly heat-resistant fluororesins, thermosetting resins and glass fiber reinforced resins. The dielectric materials used for the molds are generally preferred to have low dielectric loss factors($\tan\delta$). For example, fluororesins (polytetrafluoroethylene) and silica sinterings are preferred, which have dielectric loss factors lower than $100(\tan\delta \times 10^{-4})$. In the case that a whole mold is made of a material with a low dielectric loss factor, the rubber material is required to have a high dielectric loss factor.

When a mold itself is heated, the rubber material within the mold is vulcanized by the heat from the mold, or when rubber material is directly heated, the mold should be produced of a material having a high dielectric loss factor in order to prevent the conduction of the heat of the rubber material toward the mold and cooling of the rubber material in contact with the mold surface. Appropriate materials for such holds are epoxy resin, phenolic resin and like, which have functional groups, and alkali glasses. Fluororesins may be mixed with carbon or zinc oxide powders to obtain a higher dielectric loss factor.

Figure 1:
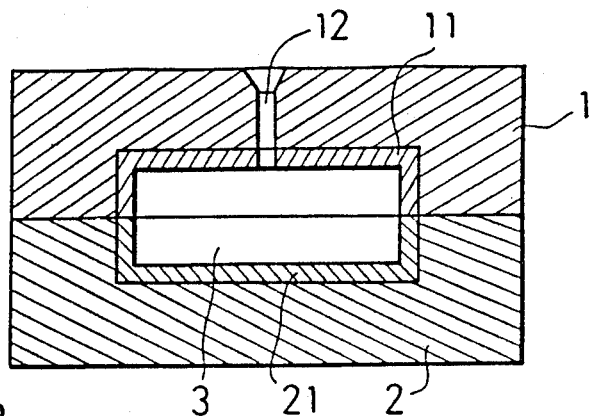
FIG. 1 is a sectional view of a typical mold, which is used for the present invention.
Figure 2:
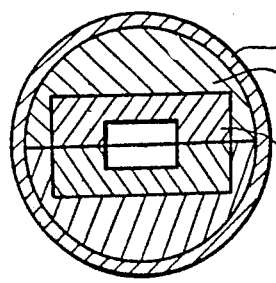
FIG. 2 is a sectional view showing a typical fastening method of a mold which is used for the present invention.

FIG. 1 shows the sectional view of a self-heating type mold, which is preferably composed of the surface portions made of a material with a high dielectric loss factor and the other portions made of another material with a low dielectric loss factor. The mold shown in FIG. 1 is a separate mold consisting of an upper mold 1 and a lower mold 2, and a cavity 3 is formed between them. The surface portions 11 and 21 of the molds which surround the cavity 3 are made of the material having a high dielectric loss factor, and the other portions are made of another material having a low dielectric loss factor. A gate 12 is disposed in the center of the upper mold 1, wherefrom the rubber material is poured in. The thickness and the dielectric loss factor of the surface portions 11 and 21 can be optionally selected in accordance with such factors as the dielectric loss factor of the rubber material and the vulcanization temperature. It is not necessary that the surface portion should keep a uniform thickness, but the portion which needs to be specially heated, is preferred to be thickened. Because the mold used for the present invention cannot be made of metals, the integrity between the separate molds should be kept by some means. For example, as shown in FIG. 2, the separate mold 10 is inserted in the cylindrical mold frame 4, and they are fixed with the fastening band 5 around their outer circumference. The mold frame 4 and the band 5 should be made of the materials each having a low dielectric loss factor.

Figure 3:
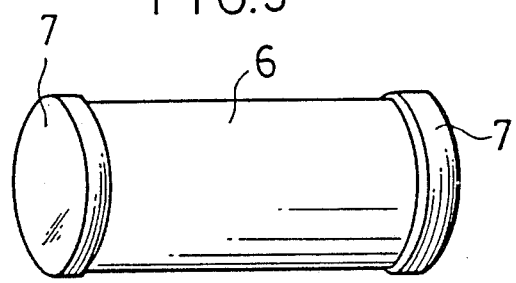
FIG. 3 is a perspective view of another fastening method.
Figure 4:
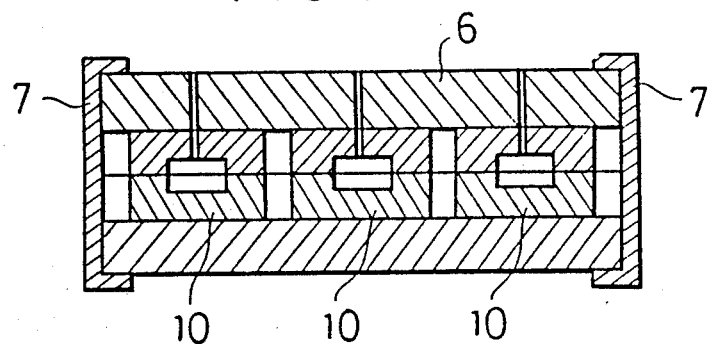
FIG. 4 is a vertical sectional view of FIG. 3.
Figure 5:
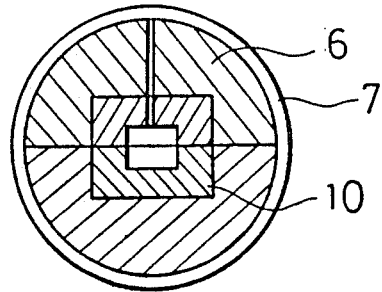
FIG. 5 is a transverse sectional view of FIG. 3.

FIG. 3-FIG. 5 shows an example of a mold frame 6, which has plural separate nolds 10. FIG. 3 is the perspective view, FIG. 4 is the vertical sectional view and FIG. 5 is the transverse sectional view. In this example, the rubber material can be poured into the separate molds 10 through the mold frame 6. The mold frame 6 is fastened to the separate molds with caps 7 which are fixed on the both ends of the mold frame. To fasten separate molds, various means other than described above can be employed, such as fastening with bolts, fasteners or clips. The rubber material is not particularly specified, but when a rubber material of a low dielectric loss factor is used, a self-heating mold should be employed. Nitrile rubber and neoprene rubber with high dielectric loss factors belong to self-heating type materials. Natural rubber, butyl rubber and ethylene-propylene rubber etc. with low dielectric loss factors can be made to be self-heating type materials by addition of such polar radical materials as carbon black, stearic acid, sulfur and zinc oxide.

The method to fill a cavity with rubber material is not limited to the pouring method as previously described, but another method may be employed in which a fixed quantity of rubber material is previously put in the mold cavity and the separate molds are neatly jointed so that the rubber material may be filled up by compression.

A conventional dielectric heating furnace can be used as a dielectric heating furnace for the present invention. Either continuous or discontinuous heating furnace is suitable, but uniform heating should be made. Heating time is not particularly limited, but it is preferable in practical use to rise temperature to the desired vulcanizing point in one to several minutes.

Since the vulcanization method of the present invention, either the rubber material or the mold itself generates heat, the thermal efficiency is remarkably higher than the method of heating the whole furnace. The heating time for vulcanization is also shortened, and the time for preheating is remarkably reduced, which results in easier operational control. Since uniform heating is possible, the precision in foamed rubber moldings and the like is considerably improved. Burr-free moldings are also obtainable.

Other processes than the vulcanization process may be the same to those for producing rubber products by use of the conventional molding dies.

What is claimed is:

1. A mold useful in a high frequency electrical energy field, comprising:

means providing an inner surface portion forming a cavity, said inner surface portion being made of a dielectric material having a relatively high dielectric loss factor; and means providing an outer surface portion formed integrally on said inner surface portion, said outer surface portion being made of a dielectric material having a relatively lower dielectric loss factor.

* * * * *